United States Patent [19]

Hofstetter

[11] Patent Number: 5,336,889

[45] Date of Patent: Aug. 9, 1994

[54] COMPOSITION AND APPARATUS FOR DETECTING GAMMA RADIATION

[75] Inventor: Kenneth J. Hofstetter, Aiken, S.C.

[73] Assignee: The United States of America as represented by the United States Department of Energy, Washington, D.C.

[21] Appl. No.: 309

[22] Filed: Jan. 4, 1993

[51] Int. Cl.$^5$ .............................................. G01T 1/20
[52] U.S. Cl. .............................. 250/361 R; 250/483.1
[58] Field of Search ................... 250/361 R, 483.1; 252/301.4 S, 301.4 F

[56] References Cited

U.S. PATENT DOCUMENTS

| | | | |
|---|---|---|---|
| 2,289,384 | 7/1942 | Renwick | 252/301.4 S |
| 3,032,659 | 5/1962 | Bacon et al. | 250/361 R |
| 3,931,523 | 1/1976 | Ambardanis | 250/390 |
| 3,988,586 | 10/1976 | Stuart et al. | 250/367 |
| 4,336,459 | 6/1982 | Fay | 250/459.1 |
| 4,365,153 | 12/1982 | Seigel et al. | 250/253 |
| 4,829,185 | 5/1989 | Cerff | 250/361 R |
| 4,916,321 | 4/1990 | Shiraishi | 250/484.4 |
| 4,956,559 | 9/1990 | Shiraishi | 250/484.4 |
| 5,122,305 | 6/1992 | Ashley et al. | 252/646 |

OTHER PUBLICATIONS

Moon, "Inorganic Crystals for the Detection of High Energy Particles and Quanta", Pyts. Review, 73 (10), May 1948, p. 1210.

*Primary Examiner*—Carolyn E. Fields
*Attorney, Agent, or Firm*—Brian R. Tumm; Harold M. Dixon; William R. Moser

[57] ABSTRACT

A gamma radiation detector and a radioluminiscent composition for use therein. The detector includes a radioluminscent composition that emits light in a characteristic wavelength region when exposed to gamma radiation, and means for detecting said radiation. The composition contains a scintillant such as anglesite ($PbSO_4$) or cerussite ($PbCO_3$) incorporated into an inert, porous glass matrix via a sol-gel process. Particles of radiation-sensitive scintillant are added to, a sol solution. The mixture is polymerized to form a gel, then dried under conditions that preserve the structural integrity and radiation sensitivity of the scintillant. The final product is a composition containing the uniformly-dispersed scintillant in an inert, optically transparent and highly porous matrix. The composition is chemically inert and substantially impervious to environmental conditions including changes in temperature, air pressure, and so forth. It can be fabricated in cylinders, blocks with holes therethrough for flow of fluid, sheets, surface coatings, pellets or other convenient shapes.

16 Claims, 1 Drawing Sheet

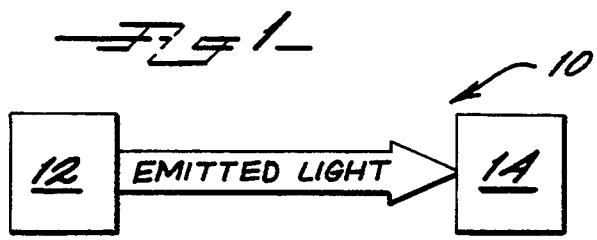
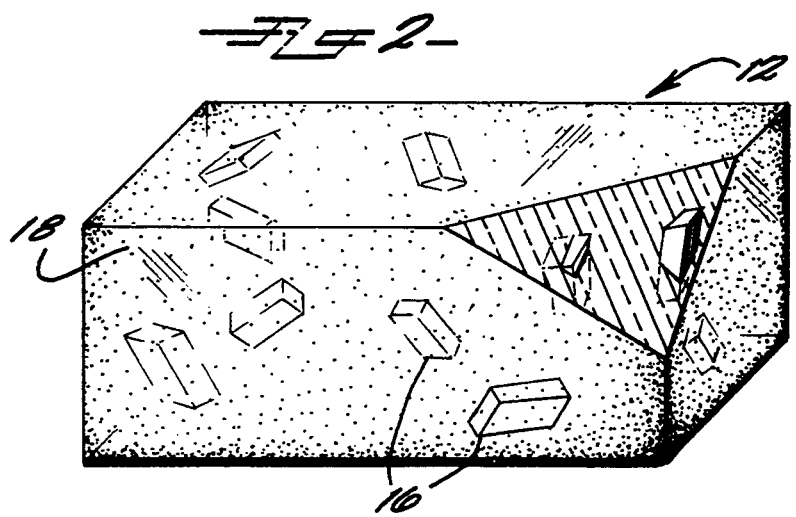
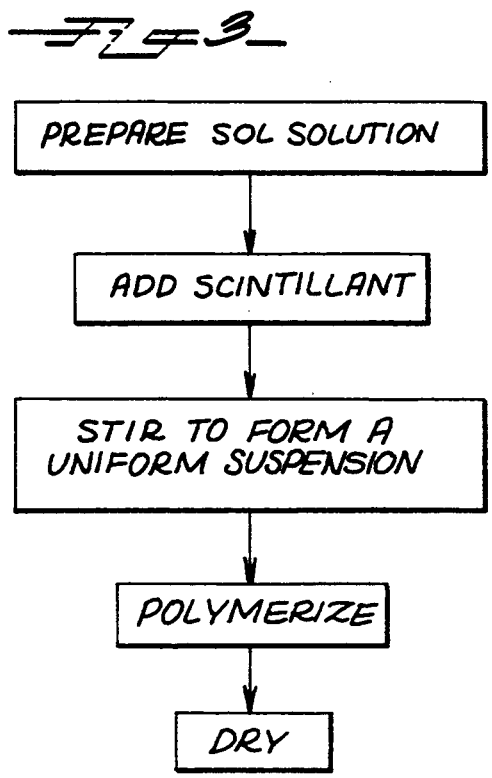

COMPOSITION AND APPARATUS FOR DETECTING GAMMA RADIATION

The United States Government has rights in this invention pursuant to Contract No. DE-AC09-89SR18035 between the U.S. Department of Energy and Westinghouse Savannah River Company.

BACKGROUND OF THE INVENTION

1. Field of the Invention

The present invention relates to the detection of ionizing radiation. In particular, the present invention relates to a gamma radiation detector and a radioluminescent composition for use therein.

2. Discussion of Background

Many different types of radiation detectors are available, including ionization chambers, proportional counters, spark chambers, semiconductor detectors, scintillation detectors, and so forth. Ionization chambers and proportional counters are widely used due to their relative simplicity and stable performance. Solid state detectors and scintillation detectors are preferred for many applications because of their sensitivity and fast response.

Scintillation detectors use materials use materials that emit brief flashes of visible light when exposed to ionizing radiation. These materials are commonly known as scintillants, radioluminescent materials, or fluorescent or phosphorescent materials. The emitted light is in a wavelength region characteristics of the particular material, with intensity proportional to the energy absorbed by the material. The light is transmitted to a photosensitive detector such as a photomultiplier, converted to a current pulse, and amplified. A pulse height analyzer records the number of pulses per unit time (or counting rate) as a function of the amplitude of each pulse. the resulting spectrum reflects the energy distribution of the pulses.

The efficiency of a scintillant is proportional to its size and effective atomic number. Large, single crystals are needed to ensure that a large portion of the incoming energy is deposited in the detector. The higher the energy of the incoming radiation, the larger the crystal must be to detect the full energy event.

Both organic and inorganic scintillators are available. Organic scintillators are available in the form of pure single crystals, liquid solutions, or solid solutions (plastics). By way of example, Stuart, in U.S. Pat. No. 3,988,586, and Ambardanis, et al., in U.S. Pat. No. 3,931,523, disclosed radiation-detecting compounds incorporated into a plastic matrix.

The light emitted by an organic scintillator decays very rapidly, making possible detectors with time resolutions of less than $10^{-9}$ sec. Such detectors are used in liquid scintillation counting and as proton-recoil detectors in fast neutron time-of-flight studies. Organic scintillators have low effective atomic numbers and therefore exhibit low detection efficiency. While they are preferred for the detection of electrons, they are not effective gamma-ray detectors. In addition, plastic and other organic scintillators are not suitable for applications where exposure to environmental conditions might lead to degradation of the scintillator material.

Inorganic scintillators typically have higher atomic numbers and better energy resolution than organic scintillators. However, the light emitted by organic scintillators decays much more slowly than light from most organic scintillators, so their time resolution is poorer. Thallium-activated sodium iodide (NaI(Tl)) is widely used for gamma-ray detection, since it has a high atomic number, the highest light output of the room-temperature inorganic scintillators, and is readily available in large,, clear, single crystals up to 30 cm in size. The small admixture of thallium increases the light output and reduces the fluorescent decay time of the NaI crystal. NaI(Tl) is used in high-sensitivity, low-background gamma counting, large multiple-detector arrays, and high-efficiency gamma ray detectors. A disadvantage of NaI(Tl), especially for environmental monitoring or severe operating environments, is that the crystals are hygroscopic and require careful handling to avoid contamination.

Semiconductor detectors provide good energy resolution, but at efficiencies no more than about 30% of a NaI(Tl) detector due to their lower atomic number. Silicon is suitable for use in the relatively low energy X-ray range, while germanium is used in the higher energy X-ray and gamma-ray ranges. However, germanium detectors must be operated at cryogenic temperatures because of their high thermal noise levels and correspondingly high leakage currents. This renders them impractical for long-term monitoring, or use in areas where maintenance at cryogenic temperatures is impractical.

There is a need for an efficient radiation detector that is insensitive to environmental conditions including temperature and humidity. Materials having high atomic numbers offer the promise of higher detection efficiencies than the NaI(Tl) detectors presently considered the industry benchmark for gamma ray detection. Many naturally-occurring minerals, including anglesite ($PbSO_4$) and cerussite ($PbCO_3$) crystals, are known to fluoresce when exposed to short wave radiation. This property has been used to selectively detect and identify ores of potential economic interest. See, for example, Seigel, et al. (U.S. Pat. No. 4,365,15) and Fay (U.S. Pat. No. 4,336,459). Anglesite and cerussite also fluoresce when exposed to gamma radiation. Both minerals are found in the form of small, irregularly shaped crystals, unlike the large, uniform single crystals needed for an efficient detector. Growth of large single crystals of $PbSO_4$ or $PbCO_3$ has not been accomplished using present technology.

SUMMARY OF THE INVENTION

According to its major aspects and broadly stated, the present invention is a gamma radiation detector and a composition for use therein. The radiation detector includes a photosensitive detector and a radioluminescent composition that emits light in a characteristic wavelength range when exposed to gamma radiation. The composition includes a dopant incorporated into an inert, porous glass matrix via a sol-gel process. The dopant, in the form of particles of a radioluminescent material such as the minerals anglesite ($PbSO_4$) or cerussite ($PbCO_3$), is added to a sol solution. The mixture is polymerized to form a gel, then dried under conditions that preserve the structural integrity and radiation sensitivity of the dopant. The final product is a composition containing the uniformly-dispersed dopant in an inert, stable and highly porous matrix. The composition is chemically inert and impervious to environmental conditions including changes in temperature, air pressure, and humidity. The composition can be fabricated in any desired form by means well known in the art, including cylinders, blocks with holes therethrough for fluid flow, sheets, surface coatings, pellets or other shapes, dimensioned to the anticipated use.

An important feature of the present invention is the dopant. The dopant is a radioluminescent material such as anglesite, cerussite, or combinations thereof. Alternatively, other scintillants such as luminescent phosphors or lithium-rich, cerium-doped silicate glass particles could be incorporated into the sol. The dopant emits light in a wavelength range characteristic of the particular material when exposed to gamma radiation. Preferably, the dopant emits light in a wavelength range suited for detection by standard photodetectors.

Anglesite and cerussite occur naturally as small, irregularly shaped crystals that scintillate in the 390 nm range when exposed to gamma radiation. The crystals are supplied in sizes that promote good light scattering in this wavelength range, preferably less than approximately 50 $\mu$m in size, and most preferably in the 30 $\mu$m–40 $\mu$m range. To optimize the surface area and radiation-detection capability of the composition, the scintillant is preferably supplied in an amount of at least approximately 10 wt. %, and most preferably at least approximately 50 wt. %, of the composition.

Another feature of the present invention is the matrix, made by a sol-gel process. A sol solution is prepared by means well known in the art. The sol is selected to optimize the desired properties of the composition. The scintillant is added to the sol, and the mixture is polymerized to obtain a gel that contains the polymerized material and a liquid as two continuous phases. The gel is dried to remove the liquid phase. All process steps, including polymerization and drying, are carried out under conditions that preserve the structural integrity and radiation-sensitivity of the scintillant. The final product is a radioluminescent composition containing a uniformly distributed scintillant in an inert, highly porous glass matrix. The matrix is preferably nonhygroscopic, and most preferably an inorganic aerogel. It is optically transparent in the characteristic wavelength range of light emitted by the scintillant (on the order of 390 nm for anglesite and cerussite crystals).

Still another feature of the present invention is the combination of the matrix and the scintillant. The high specific surface area of the matrix provides a large surface for binding the scintillant. When exposed to gamma radiation, the scintillant emits light in a wavelength range suited for detection by standard photomultipliers. The matrix has good optical transmission characteristics, so a conventional photosensitive detector such as a photomultiplier tube can convert the scintillations produced by gamma rays into current pulses for analysis by standard gamma-ray spectrometric methods.

Other features and advantages of the present invention will be apparent to those skilled in the art from a careful reading of the Detailed Description of a Preferred Embodiment presented below.

BRIEF DESCRIPTION OF THE DRAWINGS

In the drawings,

FIG. 1 is a schematic view of a gamma radiation detector according to a preferred embodiment of the present invention;

FIG. 2 is a schematic view of a composition according to a preferred embodiment of the present invention; and FIG. 3 is a flow chart of a process for making the composition of FIG. 2.

DETAILED DESCRIPTION OF A PREFERRED EMBODIMENT

A gamma radiation detector according to a preferred embodiment of the present invention is illustrated schematically in FIG. 1. Radiation detector 10. includes a radioluminescent composition 12 that emits light in a characteristic wavelength range when exposed to gamma radiation, and a photosensitive detector 14 positioned to intercept at least a portion of the emitted light. Composition 12, shown schematically in FIG. 2, includes a dopant 16 incorporated into an inert, porous glass matrix 18 via a sol-gel process. Dopant 18, in the form of particles of a radioluminescent material such as the minerals anglesite ($PbSO_4$) or cerussite ($PbCO_3$), is added to a sol solution. The mixture is polymerized to form a gel, then dried under conditions that preserve the structural integrity and radiation sensitivity of the dopant.

In a typical sol-gel process, a sol solution containing an organic liquid such as alcohol together with a metal oxide, alkoxide, alcoholate, sulfide or the like, is polymerized to obtain a gel. The gel is dried to remove the liquid phase and obtain a porous glass product. Xerogels, having porosities up to approximately 80 vol. %, are produced by drying at room temperature (about 20° C.) and atmospheric pressure. Aerogels, with porosities up to 90 vol. % or higher, result from drying under supercritical temperature and pressure conditions.

The high porosity and associated high specific surface area of xerogels and aerogels provides a large number of surface sites for binding additives incorporated into the sol. Other advantages of sol-gel processes include low energy requirements, production of a high purity product, and uniform dispersion of additives into the product. A number of porous glass compositions have been developed. For example, an aerogel substrate is loaded with tritium and a radioluminescent material, whereby the tritium is the energy source for the radioluminescent material (Ashley, et al., U.S. Pat. No. 5,078,919).

According to a preferred embodiment of the present invention, a radioluminescent composition for detecting gamma radiation is prepared by a sol-gel process generally as shown in FIG. 3. Particles of a radioluminescent material are added to a sol solution, the mixture is polymerized to form a gel, then dried under conditions that preserve the structural integrity of the particles. The final product is a radioluminescent composition (composition 12) containing uniformly-dispersed scintillant particles in an inert, stable and highly porous matrix.

Composition 12 is prepared as follows:

1. A sol solution is prepared by means well known in the art. The choice of sol depends on the properties of the scintillant and the desired properties of the composition, including its density, index of refraction, optical transparency, and so forth. The final product should transmit at least a portion of the light emitted by the scintillant. A 1"–2" (about 2.5 cm–5.1 cm) thick section of the composition should transmit at least approximately 10%, preferably at least approximately 50%, and most preferably at least 90% of the emitted light. The scintillant should be substantially insoluble in the sol. Preferably, the sol is such as will produce a stable, nonhygroscopic composition having good resistance to environmental factors including temperature and humidity, most preferably an aerogel.

By way of example only, silica aerogels are prepared by mixing an oxidated silicon compound with alcohol, water, and an acid. Suitable precursors include, but are not limited to, silica, alkali metal silicates, alkaline earth metal silicates, and mixtures thereof. The proportions of the ingredients, pH, and process conditions are chosen to optimize the desired properties of the final product. Thus, the higher the alcohol:water ratio of the mixture, the more uniform the final product; and the lower this ratio, the more granular the product. The pH and temperature of the mixture also affect the density, porosity, and specific surface area of the product. The optimum conditions for producing a composition with the desired properties are therefore best determined by observation and a modest degree of experimentation for each particular sol.

If desired, preparation of the sol may include additional steps such as conditioning for several hours at room temperature, evaporation of some of the solvents to increase the viscosity, etc.

2. A dopant is added to the sol, and the mixture is stirred to uniformly suspend the dopant in the solution. The dopant is in the form of a radioluminescent material known to be sensitive to gamma radiation. When exposed to gamma radiation, the dopant emits light in a wavelength range characteristic of the particular material. Suitable scintillants include, but are not limited to anglesite ($PbSO_4$), cerussite ($PbCO_3$), and combinations thereof.

Anglesite and cerussite occur naturally as small, irregularly-shaped (generally rhomboid) crystals that scintillate in the 390 nm range when exposed to gamma radiation. The crystals are supplied in sizes that promote good light scattering therefrom, preferably less than approximately 50 $\mu$m in size, and most preferably in the 30 $\mu$m–40 $\mu$m range.

The composition contains at least approximately 10 wt. % scintillant, that is, 100 grams of the composition contains at least 10 grams of scintillant. Most preferably, the composition contains at least approximately 50 wt. % scintillant (50 grams of scintillant per 100 grams composition). The concentration of the scintillant can vary within a wide range, as long as the final product is capable of producing a measurable amount of light when exposed to gamma radiation. The sensitivity of the composition to gamma radiation is generally proportional to the available surface area of the scintillant. The optimum concentration depends on such factors as the size of the crystals, the choice of sol, the volume of the composition, and the optical transparency of the composition. At low scintillant concentrations, a large fraction of the photons emitted by the scintillant exit from the composition and may be detected. As the concentration increases, more and more photons are absorbed by other scintillant particles. When the volume of the composition and the scintillant concentration are sufficiently large, additional increases in scintillant concentration have no effect on the number of exiting photons, since all the additional emitted photons are absorbed within the composition.

Other radioluminescent materials that emit light in a wavelength range suited for detection by standard photomultipliers can be used in the present invention. For example, lithium-rich, cerium-doped silicate glass could be ground into a powder and dispersed in the sol. Similarly, luminescent phosphors could be incorporated into the sol. It will be understood that the optimum particle size, amount, etc. are best determined by observation and a modest degree of experimentation for each particular combination of sol and scintillant.

3. If desired, other additives may be supplied, including but not limited to foaming agents to adjust the density of the mixture and gelation promoters to speed up polymerization.

4. The mixture is polymerized by equilibrating until a gel containing the polymerized material and a liquid as two continuous phases is formed. Depending on the properties of the sol and the scintillant (to be discussed below), and the desired properties of the composition, polymerization may be carried out in air at room temperature and atmospheric pressure, at different temperatures or pressures, in an inert atmosphere, or some convenient combination thereof. For example, lower temperatures typically slow down the polymerization reaction and may be desirable to prevent overly abrupt polymerization. The time required for substantially complete polymerization varies from a few minutes to several days, depending on the temperature, pressure, atmosphere, the pH of the sol, the materials used to produce the sol, and so forth. The optimum conditions for polymerization are best determined by experimentation for each particular combination of materials.

5. If desired, the gel is aged in order to strengthen the polymeric network.

6. The gel is dried to remove the liquid phase. Drying may be carried out in air at atmospheric pressure, at different pressures, or in other atmospheres including inert atmospheres.

All the process steps described above are carried out under conditions that preserve the structural integrity and sensitivity to gamma radiation of the scintillant. The sol-gel process is therefore a "low temperature" process, that is, the temperature remains within a range where the scintillant retains its crystalline form and does not undergo melting, decomposition, dissolution, vaporization, etc. For example, anglesite melts at about 1170° C.; cerussite decomposes at about 315° C. (The term "decomposition" is used in its commonly accepted sense, to mean the chemical separation of a substance into two or more substances, which may differ from each other as well as from the original substance.) Compositions containing these two scintillants should be prepared by process steps taking place below the melting point of anglesite or the decomposition point of cerussite. The scintillant is not chemically bound to the gel structure when processed at low temperatures, but rather physically associated by encapsulation or embedding, absorbed or adsorbed into the gel, or some other form of association which preserves its structural integrity.

As noted above, the choice of sol depends on the physical and chemical properties of the scintillant. The sol should polymerize to a composition having no absorbance bands in or near the characteristic scintillation wavelength range (on the order of 390 nm for anglesite and cerussite crystals). The composition should transmit at least a portion of the light emitted by the scintillant.

The scintillant must be substantially insoluble in the sol. For example, anglesite and cerussite crystals are largely insoluble in water, with solubilities of 0.00425 g/100 cc and 0.00011 g/100 cc, respectively. Solubilities in other liquids differ. For these and other scintillants, the relevant properties needed to determine the appropriate choice of sol are readily found in standard references well known to those of ordinary skill.

The final product is a radioluminescent composition containing a uniformly distributed scintillant in an inert, porous glass matrix. The matrix is highly porous, with a porosity greater than approximately 30 vol. % and preferably greater than about 80 vol. %. The pore size is in the range of 1 nm–500 nm and the density is less than approximately 1.5 g/cm$^3$, preferably less than about 0.5 g/cm$^3$. Because of its high porosity, the matrix has a high specific surface area, greater than approximately 300 m$^2$/g and most preferably greater than 1000 m$^2$/g. The high specific surface area of the matrix provides a large surface for binding the scintillant.

The composition is impervious to changes in temperature, air pressure, humidity, and so forth, as occur in most environments. In particular, the composition is chemically inert and nonhygroscopic. The composition is preferably inorganic, and most preferably an inorganic aerogel, although organic materials with the desired properties may be used if convenient. It can be fabricated in any desired form by means well known in the art, including cylinders, blocks with holes therethrough for fluid flow, sheets, surface coatings, pellets or other convenient shapes, dimensioned to the anticipated use.

Anglesite and cerussite scintillate in a wavelength range well suited for detection by standard photosensitive detectors including photomultiplier tubes. Therefore, a radiation detector 10 according to the present invention couples a suitably-formed section of a composition 12 to any appropriate photosensitive detector 14. Detector 14 converts the scintillations produced by gamma rays into current pulses for analysis by standard gamma-ray spectrometric methods. Preferably, detector 14 is adapted to detecting light in the characteristic wavelength range of scintillant 16. Such a radiation detector is competitive with NaI (Tl)-based detectors in sensitivity and offers the additional advantage of environmental stability.

It will be apparent to those skilled in the art that many changes and substitutions can be made to the preferred embodiment herein described without departing from the spirit and scope of the present invention as defined by the appended claims.

WHAT IS CLAIMED IS:

1. A composition for use in detecting gamma radiation, said composition consisting essentially of:
   a porous glass; and
   a scintillant dispersed in said porous glass, said scintillant emitting light in response to gamma radiation incident thereon.

2. The composition as recited in claim 1, wherein said scintillant is selected from the group consisting essentially of anglesite, cerussite, and combinations thereof.

3. The composition as recited in claim 1, wherein said porous glass is an aerogel.

4. The composition as recited in claim 1, wherein said porous glass is substantially transparent to light emitted by said scintillant.

5. An apparatus for detecting gamma radiation, said apparatus comprising:
   a composition, said composition consisting essentially of a porous glass matrix, and a scintillant dispersed in said porous glass matrix, said scintillant emitting light in a characteristic wavelength region when gamma radiation is incident thereon; and
   means for detecting the emitted light, said light-detecting means positioned with respect to said glass matrix to intercept at least a portion of the emitted light.

6. The apparatus as recited in claim 5, wherein said scintillant is in the form of particles less than approximately 40 μm in size, and wherein said scintillant is selected from the group consisting essentially of anglesite, cerussite, and combinations thereof.

7. The apparatus as recited in claim 5, wherein said matrix is a nonhygroscopic aerogel.

8. The apparatus as recited in claim 5, wherein said matrix has a porosity of at least approximately 80 vol. % and a specific surface area of at least approximately 1000 m$^2$/g.

9. A gamma radiation detector, said detector comprising:
   a composition, said composition consisting essentially of a porous glass matrix and a scintillant, said scintillant emitting light in a characteristic wavelength region when gamma radiation is incident thereon and said matrix transmitting at least a portion of the emitted light, said composition prepared by a process including the steps of
     mixing particles of said scintillant with a sol to form a mixture,
     polymerizing said mixture to form a gel, and
     drying said gel; and
   means for detecting the transmitted light, said light-detecting means positioned to intercept at least a portion of the transmitted light.

10. The detector as recited in claim 9, wherein said scintillant is selected from the group consisting essentially of anglesite, cerussite, and combinations thereof.

11. The detector as recited in claim 9, wherein said scintillant has a melting point and said process steps are carried out at temperatures less than said melting point.

12. The detector as recited in claim 9, wherein said scintillant has a decomposition point and said process steps are carried out at temperatures less than said decomposition point.

13. The detector as recited in claim 9, wherein said matrix is a nonhygroscopic aerogel.

14. The detector as recited in claim 9, wherein said matrix has a porosity of at least approximately 80 vol. % and a specific surface area of at least approximately 1000 m$^2$/g.

15. The detector as recited in claim 9, wherein 100 grams of said composition contains at least approximately 10 grams of said scintillant.

16. The detector as recited in claim 9, wherein 100 grams of said composition contains at least approximately 50 grams of said scintillant.

* * * * *